US008126944B2

(12) United States Patent (10) Patent No.: US 8,126,944 B2
McArdle (45) Date of Patent: Feb. 28, 2012

(54) UNORDERED/FUZZY FILE PATH

(75) Inventor: James M. McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2062 days.

(21) Appl. No.: 10/988,460

(22) Filed: Nov. 12, 2004

(65) Prior Publication Data

US 2006/0106899 A1 May 18, 2006

(51) Int. Cl.
*G06F 17/30* (2006.01)
(52) U.S. Cl. .................................................. 707/828
(58) Field of Classification Search .................. 707/100
See application file for complete search history.

(56) References Cited

U.S. PATENT DOCUMENTS

| | | | | |
|---|---|---|---|---|
| 4,974,149 | A * | 11/1990 | Valenti | 709/217 |
| 5,388,257 | A * | 2/1995 | Bauer | 707/1 |
| 5,497,492 | A | 3/1996 | Zbikowski et al. | 395/700 |
| 5,978,791 | A * | 11/1999 | Farber et al. | 707/2 |
| 6,049,799 | A * | 4/2000 | Mangat et al. | 707/10 |
| 6,195,650 | B1 | 2/2001 | Gaither et al. | 707/1 |
| 6,286,013 | B1 | 9/2001 | Reynolds et al. | 707/200 |
| 6,341,291 | B1 * | 1/2002 | Bentley et al. | 707/203 |
| 6,370,549 | B1 * | 4/2002 | Saxton | 707/205 |
| 6,381,615 | B2 * | 4/2002 | Gaither et al. | 707/200 |
| 6,389,427 | B1 * | 5/2002 | Faulkner | 707/104.1 |
| 6,470,345 | B1 * | 10/2002 | Doutre et al. | 707/100 |
| 6,510,439 | B1 * | 1/2003 | Rangarajan et al. | 707/201 |
| 6,535,894 | B1 * | 3/2003 | Schmidt et al. | 707/204 |
| 6,968,345 | B1 * | 11/2005 | Muhlestein | 707/103 R |
| 7,065,588 | B2 * | 6/2006 | Konda et al. | 709/246 |
| 2005/0114296 | A1 * | 5/2005 | Farber et al. | 707/1 |
| 2005/0262502 | A1 * | 11/2005 | Lari et al. | 717/175 |
| 2006/0059204 | A1 * | 3/2006 | Borthakur et al. | 707/200 |

OTHER PUBLICATIONS

The Unix Language Family. Chapter 5 of Using Computer in Linguistics: A Practical Guide. By John M. Lawler.*
Index of/distribution/contrib/archiveur/archiveur/March-Search. Author: Eric D. Friedman. Copyright 1996.*
File Access and Directory Systems Calls. White paper by Dave Marshall. Jan. 5, 1999.*
Accessing Files on Unmounted File Systems. Willem A. Schreuder. pp. 163-168 of the processdings. LISA 2001 paper.*

* cited by examiner

*Primary Examiner* — Neveen Abel Jalil
(74) *Attorney, Agent, or Firm* — Lizzy Z. Toub; Gregory K. Goshorn; Greg Goshorn, P.C.

(57) ABSTRACT

Provided is an abstracting mechanism for the naming of files in a computing system. When a document is saved, individual components of the file path are segregated and the filename extension becomes the first component in a new file path. Remaining components are rearranged into the new file path according to a simple alphanumeric ordering scheme. In another embodiment, the order of file path components is determined by either some type of hash function or according to a predefined ordering function. Also provided is a search technique that takes advantage of the claimed file mapping technique. A file path is broken into an unordered set of components that are treated with equal weight when performing a search. Files are sorted and displayed based upon a number of "hits," each hit representing a match between a component of the file path and a term of a search term.

20 Claims, 6 Drawing Sheets

UNORDERED/FUZZY FILE PATH

TECHNICAL FIELD

The present invention relates generally to computer storage and, more specifically, to a novel method of organizing files in a computer directory structure.

BACKGROUND OF THE INVENTION

Through the years computer memory has both dropped in price and increased in density. Several decades ago, computer memory was measured in groups of one thousand bytes, or "kilobytes" (KB), with sixty-four kilobytes (64 K), of memory being considered a large amount of memory. As technology progressed, memory began to be defined first in terms of megabytes (MB), each of which represent one thousand K kilobytes (1,000 KB), Gigabytes, each of which represent one thousand megabytes (1,000 MB) and even terabytes, each of which represent on thousand Gigabytes (1,000 GB). Soon, memory will expand into the domain of petabytes, each of which represents one thousand terabytes (1,000 TB), one million gigabytes (1,000,000 GB), one billion megabytes (1,000,000,000 MB) or one thousand billion kilobytes (1,000,000,000,000 KB).

As memory has expanded, data has also expanded to fill the new memory spaces. Data is typically organized within a particular memory space into filepaths or "storage trees" that consist of a string of components, e.g. directories, multiple levels of sub-directories and file names. Each increase in memory capacity has increased the number of components, or the potential "depth" of the storage tree, that point to a particular file path. This creates issues with respect to both file retrieval and the avoidance of duplicate files. For example, a file that has five path components, i.e. "/directory_1/sub_dir_1/sub_dir_2/sub_dir_3/file_name.doc," may be hard to find if a user does not remember all the components in the correct order. Further, if the file is saved under a slightly different path, or a path that has had the components inadvertently rearranged, i.e. "/directory_1/sub_dir_2/sub_dir_1/sub_dir_3/file_name.doc," a duplicate file may be created causing data storage anomalies such as, but not limited to, deletion and update anomalies.

File system search programs allow limited use of wildcards, such as '?' and '*' characters, for the abstraction of a filename but this doesn't necessarily help if the order of the components in the file path has been forgotten. The Unix system provides a linking mechanism so that a file can be associated with one or more alternative directories. Neither of these capabilities address all the underlying issues in file location and retrieval.

A method of organizing computer memory so that files are easy to locate, even with incomplete knowledge of the particular file path would be greatly appreciated by computer users. Also appreciated would be a method of computer file organization that mitigates the possibility of duplicate files and the file anomalies that can result.

SUMMARY OF THE INVENTION

Provided is a generic abstracting mechanism for the naming of files in a computing system. Simply stated, the claimed subject matter disassociates a file path into an unordered set of components that are treated with equal weight when performing a file system search.

When a document is saved, the individual components of the file path are segregated. This includes separating the filename from the filename extension, e.g. "filename.doc" is separated into "filename" and "doc." In one embodiment, the filename extension becomes the first component in a new, modified file path. The remaining components are rearranged into the new file path according to a simple, unambiguous alphanumeric ordering scheme. In this manner, files are organized by type, e.g. all Microsoft Word documents are stored in the same area. In another embodiment, rather then employing an alphanumeric order scheme, the order of file path components is determined by either some type of hash function or according to a predefined ordering function.

In one embodiment of the method, only a portion of a file system is mapped according to the claimed subject matter, i.e. elements of the file system are mapped in the traditional manner and other portions are mapped according to the disclosed method. For example, specific directories may be mapped in a traditional manner and other directories are mapped according to the methods described herein. In another embodiment, only a portion of a particular file path is mapped according to the disclosed method. For example, top-level directories may be maintained in the traditional manner and sub-directories are mapped according to a disclosed method.

The claimed approach provides easy access to files even if a user does not remember the exact components and/or order of a particular file path. Further, by mapping some duplicate files to the same directory, duplicate files can be discovered, thus enabling computer memory may be used more efficiently.

Also provided is a search technique that takes advantage of the claimed file mapping technique. Files are sorted and displayed based upon a number of "hits," each hit representing a match between a component of the file path and a term of a search term.

BRIEF DESCRIPTION OF THE DRAWINGS

A better understanding of the present invention can be obtained when the following detailed description of the disclosed embodiments is considered in conjunction with the following drawings, in which.

DETAILED DESCRIPTION OF THE FIGURES

Although described with particular reference to a Windows operating system and a storage structure employing directories and files, the claimed subject matter can be implemented in any information technology (IT) system in which the efficient storage of computer data is desirable. Those with skill in the computing arts will recognize that the disclosed embodiments have relevance to a wide variety of computing environments and file storage structures in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

Figure 1:
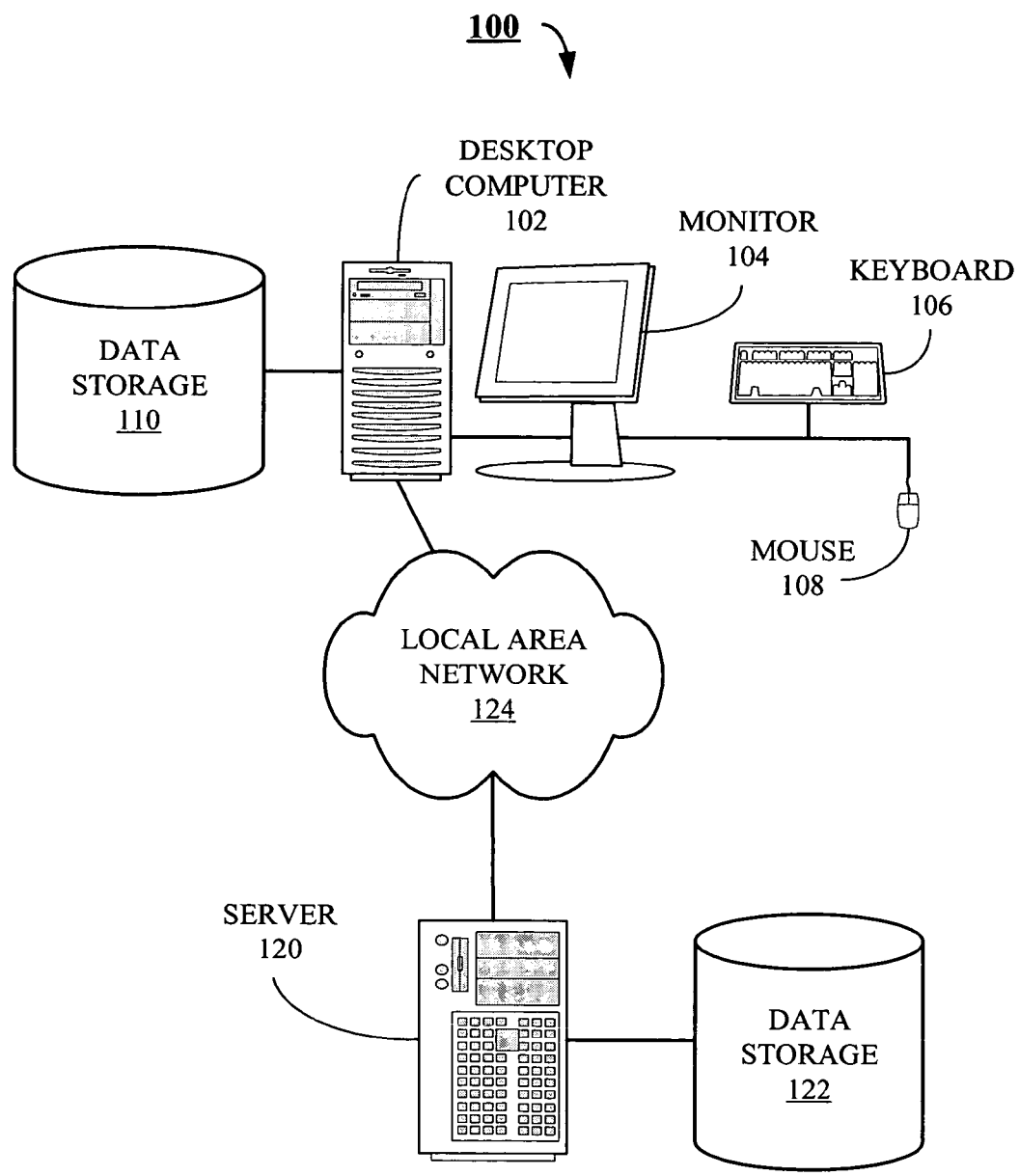
FIG. 1 is a block diagram of a computing system architecture that includes the claimed subject matter.

Turning now to the figures, FIG. 1 is a block diagram of an exemplary computing system architecture 100 that incorporates the claimed subject matter. A desktop computer 102 includes a monitor 104, a keyboard 106 and a mouse 108, which together facilitate human interaction with computer 102. Attached to computer 102 is a data storage device 110, which may either be incorporated into computer 102 i.e. an internal device, or attached externally to computer 102 by means of various, commonly available connection devices such as but not limited to, a universal serial bus (USB) port (not shown).

A server computer 120 is attached to a data storage component 122, which, like data storage 110, may be an internal or external device. Computer 102 and server 120 are communicatively coupled via a local area network (LAN) 124. In alternative embodiments, computer 102 and server 120 may be coupled via a direct connection or the Internet.

Figure 2:
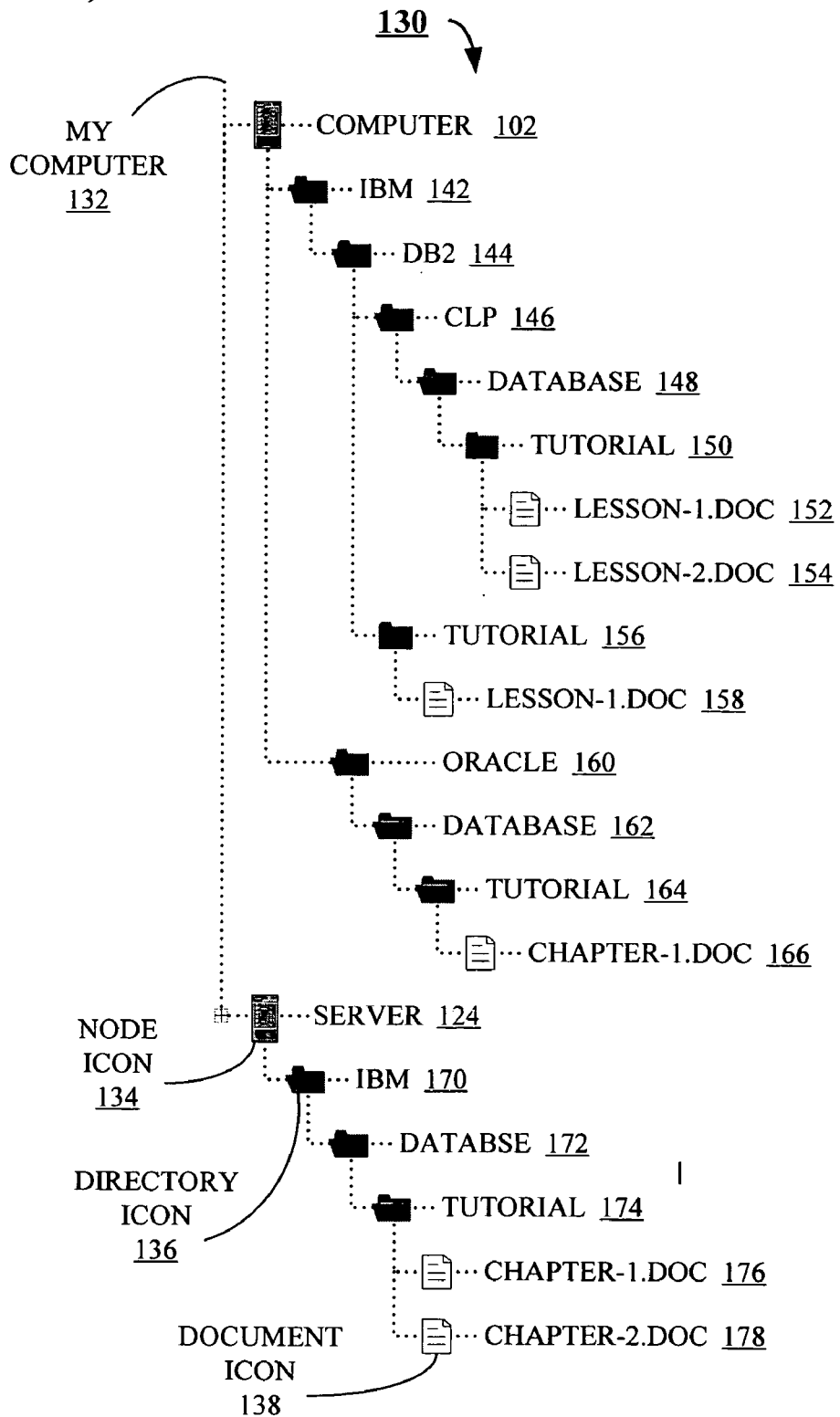
FIG. 2 is a diagram of an exemplary file system tree structure that spans the computing devices of FIG. 1.

FIG. 2 is a diagram of an exemplary file system tree structure 130 that spans the computing devices 102 and 120 and the corresponding data storages 110 and 122 of FIG. 1. Using a Window's file structure as an example, tree 130 starts at a My Computer top-level 132. Computer 102 and server 124 are represented by Node icons 134, which for the sake of simplicity only one of which is numbered. Both directories and sub-directories are represented by directory icons 136, only one of which is numbered, and documents are represented by document icons 138, again only one of which is numbered.

Stored on data storage 110 of computer 102, under My Computer directory 132, are an IBM directory and an Oracle directory 160. IBM directory includes two sub-directories, a DB2 directory 144 and a Tutorial directory 150. Under DB2 directory 144, a sub-directory is stored as CLP directory 146, which includes a sub-directory, or Database directory 148. Database directory includes a subdirectory, or Tutorial directory 150, which stored two, exemplary documents, a Lesson-1.doc document 152 and a Lesson-2.doc document 154.

A Tutorial directory 156, which is stored within DB2 directory 144 includes a Lesson-1.doc document 158. For the purposes of this example, Lesson-1.doc 158 is an inadvertently created duplicate of Lesson-1.doc 152. Under Oracle directory 160, is a sub-directory, Database directory 162, which includes a sub-directory, Tutorial directory 164. Tutorial directory 164 includes a Chapter-1.doc document 166.

Figure 3:
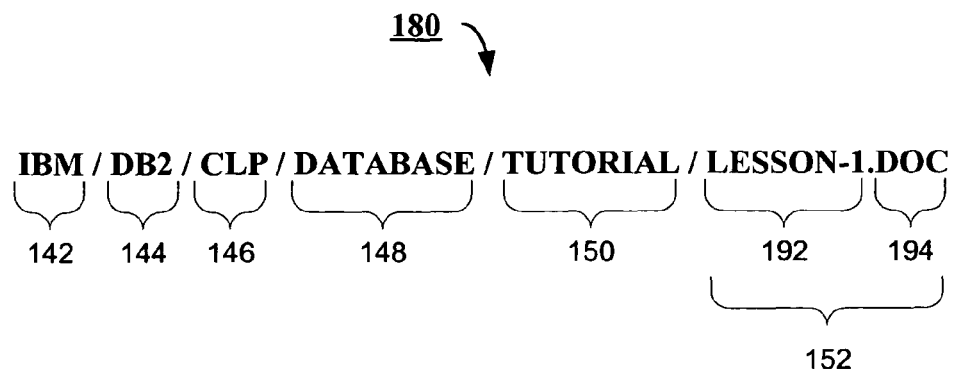
FIG. 3 is a diagram of an exemplary, typical file path prior to an implementation of the claimed subject matter.

FIG. 3 is a diagram of an exemplary file path 180 prior to an implementation of the claimed subject matter. File path 180 corresponds to a path to document 152, "Lesson-1.doc," which is stored on data storage 110 (FIG. 1) of computer 102 (FIGS. 1 and 2). Rather than being displayed in a tree structure such as file tree 130, file path 180 is shown as components 142, 144, 146, 148, 150 and 152 (FIG. 2), with adjacent components separated by a '/' character. Those with skill in the computing arts will recognize this particular nomenclature for describing a path through a file tree such as tree 130.

Document 152 is divided into two separate components, a file name component 192 and an extension component 194. Components 192 and 194 are separated by a '.' character, or a period. In general, a file's extension is a good indicator of the type of file and/or the application that generated the file. For example, ".doc" extension 194 indicates that the file represented by path 180 is in a format corresponding to Word, published by the Microsoft Corporation. Of course, document 152 might have been generated by a program other than Word that merely saved document 152 in a Word format for compatibility purposes.

Figure 4:
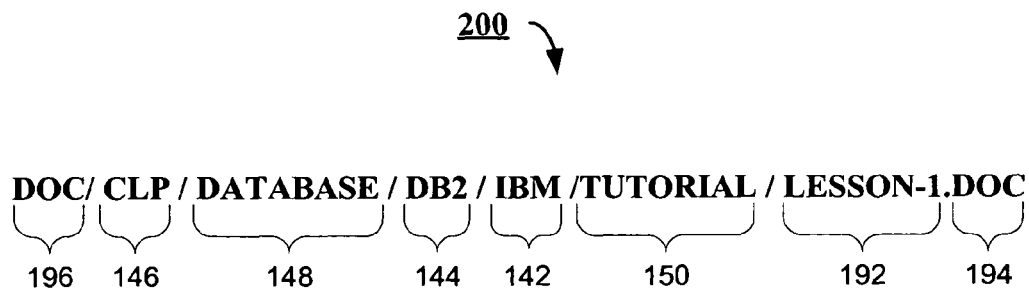
FIG. 4 is the file path of FIG. 3 after one of the disclosed technique has been implemented.

FIG. 4 is a diagram of an exemplary file path 200 corresponding to file path 180 of FIG. 3 after one of the disclosed technique has been implemented. In short, components 142, 144, 146, 148, and 150 are rearranged based upon a metric, in this example a metric based upon an alphanumeric ordering scheme. In other words, components 142, 144, 146, 148, and 150 have been placed in alphabetical order. It should be noted that many other ordering techniques may be employed rather than an alphanumeric ordering scheme. For example, in the alternative, the order can be based upon a hashing function or an ordering function that assigns a metric to a component based upon a predefined ranking. Two of many possible examples of ordering functions metrics are metrics based upon an expected frequency of occurrence and metrics based upon predefined "special" words, e.g. the term "IBM" receives a higher metric than "Oracle."

Figure 5:
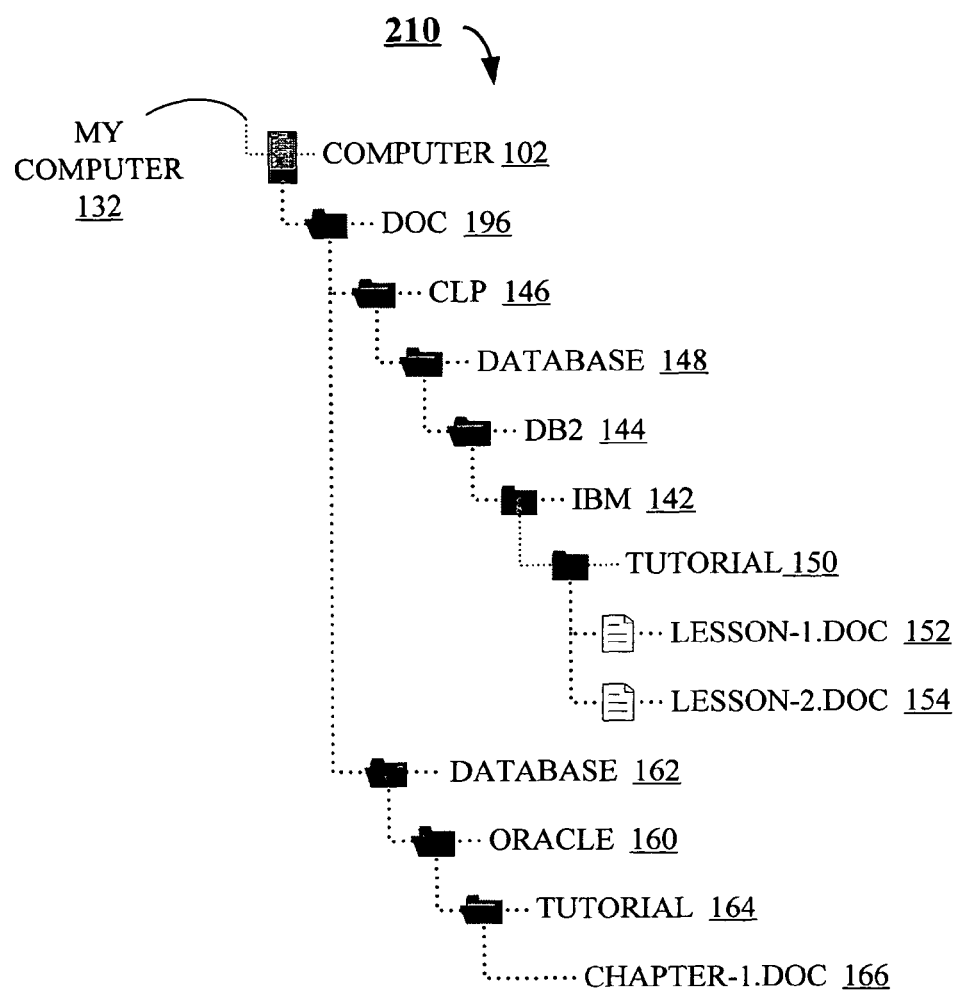
FIG. 5 is a diagram of a file system tree structure corresponding to the modified file path of FIG. 4.

The first component of path 200 is a new "Doc" component 196, corresponding to component 194, that ensures that files of a particular type share a branch of a particular file tree (see FIG. 5). In other words, in this example, all documents that are in a Word format are stored in the same high-level, Doc directory 196. Other examples of types of files that would be stored together under the disclosed techniques include, but are not limited to, Excel, or ".xls," files, text, or ".txt," files and so on.

FIG. 5 is a diagram of a file system tree structure 210 corresponding to reorganized file path 200 of FIG. 4. My computer 132 remains the same as in tree 130 (FIG. 2). For the sake for simplicity, only the portion of tree 130 corresponding to computer 102 (FIGS. 1 and 2) is shown. It should be noted that the portions of tree 130 corresponding to server 124 are also be reorganized according to the disclosed techniques. In the alternative, server 124, and even designated portions of tree 130, may be maintained in the original ordering scheme.

Like tree 130, file tree 210 starts at My Computer top-level 132. Stored on data storage 110 (FIG. 1) of computer 102, under My Computer directory 132, is Doc directory 196, which, as explained above in conjunction with FIG. 4, is a new directory created so that files of a particular type or format are stored together. Under Doc directory 196, are CLP directory (FIGS. 2-4), and Database directory 162 (FIGS. 2-4)

CLP directory 146 includes sub-directory Database directory 148 (FIGS. 2-4), which includes sub-directory DB2 directory 144 (FIGS. 2-4). DB2 directory 144 includes sub-directory IBM directory 142 (FIGS. 2-4), which includes sub-directory Tutorial directory 150 (FIGS. 2-4). Under Tutorial directory 150 are documents 152 (FIGS. 2-4) and 154 (FIG. 2).

In tree 210 under Database directory 162, is sub-directory Oracle directory 160, which includes a sub-directory, Tutorial directory 164. Tutorial directory 164 includes Chapter-1.doc document 166.

Figure 6:
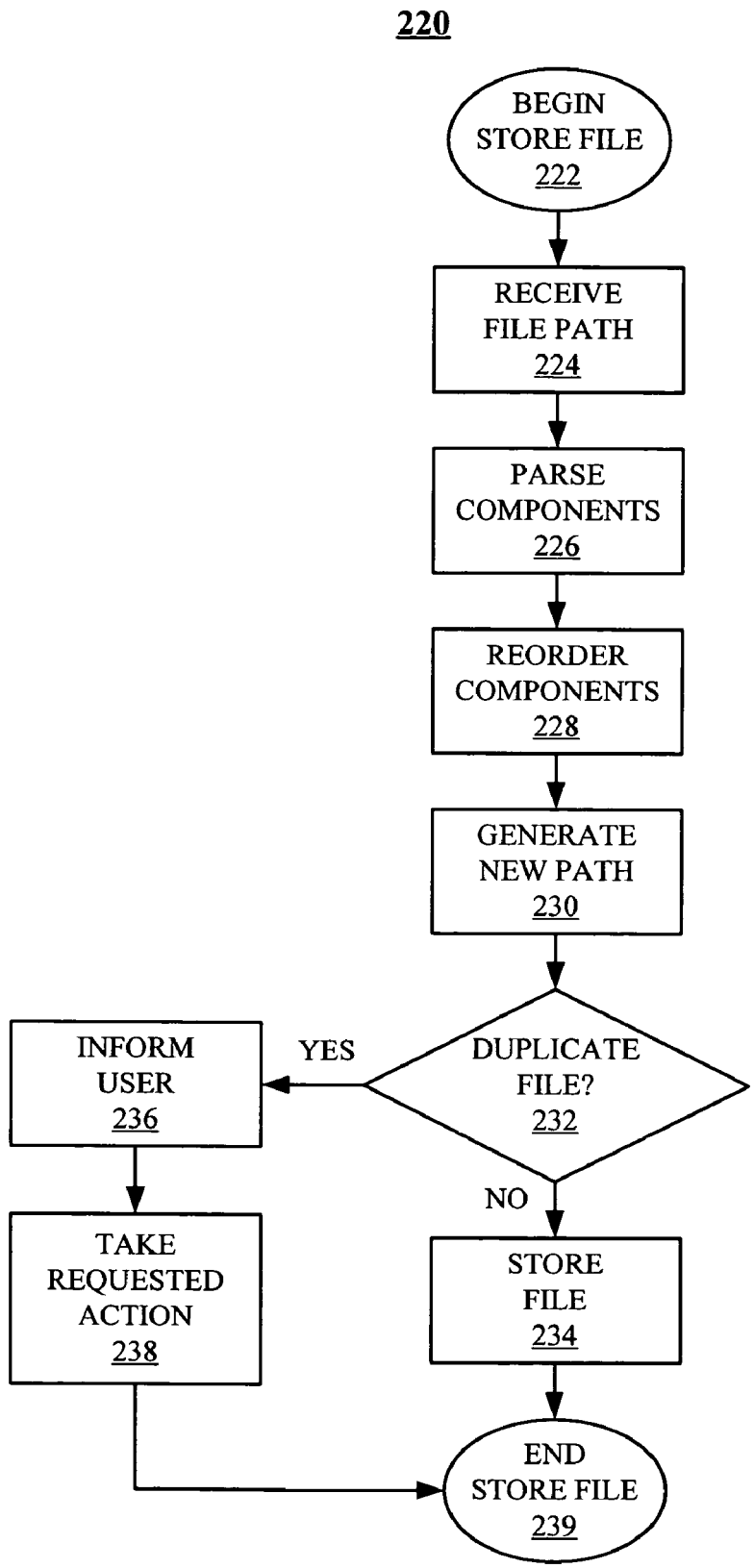
FIG. 6 is a flowchart of file storing process that implements the claimed subject matter.

FIG. 6 is a flowchart of file storing process 220 that implements an aspect of the claimed subject matter. Process starts in a "Begin Store File" block 222 and control proceeds immediately to a "Receive File Path" block 224. During block 224, process 220 receives fully qualified filename corresponding to a file to be stored. The file may be any new or existing file. For example, the file may be created by a user saving a Word document. In the following example, the received file path is file path 180 (FIG. 2). Control then proceeds to a "Parse Components" block 224, during which process 220 breaks, or parses" file path 180 into different components 142, 144, 146, 148, 150, 152, 192 and 194.

Once components 142, 144, 146, 148, 150, 152, 192 and 194 have been isolated, process 220 proceeds to a "Reorder Components" block 228, during which process 220 rearranges the order of components 142, 144, 146, 148 and 150 according to a predefined scheme. It should be noted that document name 152 and related components 192 and 194 are not subjected to this reordering but rather are treated in a different manner, which is described below. One embodiment of the claimed subject matter employs an alphanumeric ordering scheme by placing components 142, 144, 146, 148 and 150 in alphabetical order. Other embodiments may use a hashing scheme or order the components based an ordering function. One with skill in the art should recognize there are many possible ordering schemes that may be chosen to be applied to particular implementation of the claimed subject matter.

Once components 142, 144, 146, 148 and 150 have been reordered, process 220 proceeds to a "Generate New Path" block 230 during which process 220 creates, from components 142, 144, 146, 148, 150, 152 and 194 modified path 200, described above in conjunction with FIGS. 4 and 5. The first element of path 200 is directory 196, which as explained above corresponds to extension 194, and the last element is filename 152. In between Doc directory 196 and file name 152 are the reordered components 146, 148, 144, 142 and 150, in the order determined in block 228.

Once the new path has been generated, control proceeds to a "Duplicate File?" block 232 during which process 220 determines whether or not the path created in block 230 has already been used by another file, i.e. whether or not the file is a duplicate. Sometimes a file may be inadvertently filed in two different locations. The disclosed file storage technique is able to reveal the existence of files that have been stored using rearranged file path. If the file is not a duplicate, then process 220 proceeds to a "Store File" block during which process 220 saves the file to data storage 110 using the file path generated during block 230.

If in block 232, process 220 determines the existence of duplicate files, control proceeds to an "Inform User" block 236 during which the user saving the file is notified as to the conflict. Process 220 then proceeds top a "Take Requested Action" block 238 during which the user is offered a number of options and a selected option is taken. For example, the user is asked whether the new file should be discarded or used to overwrite the detected duplicate.

Finally, from Take Requested Action block 238 and Store File block 234, process 220 proceeds to an "End Store File" block 239 in which process 220 is complete.

Figure 7:
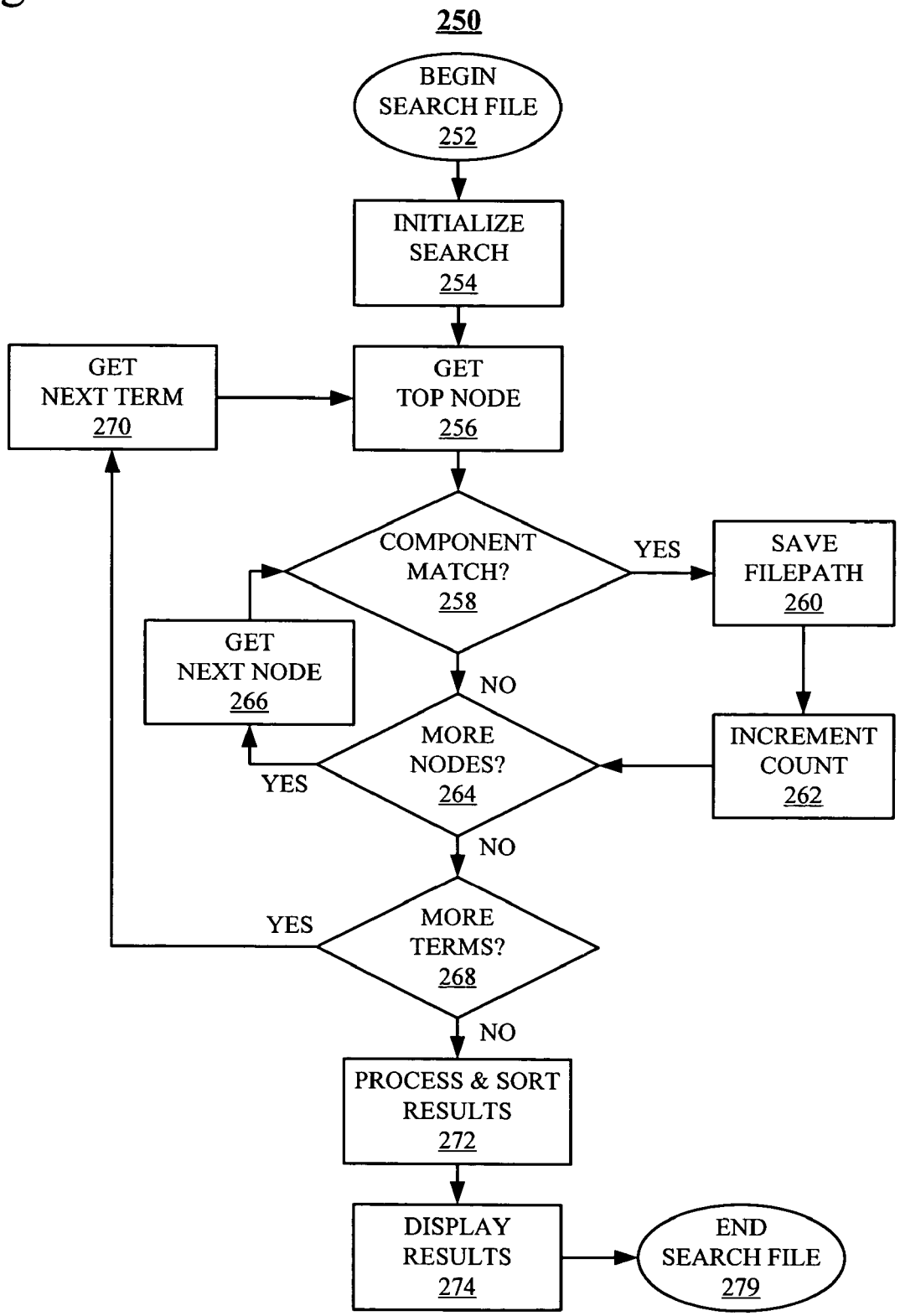
FIG. 7 is a flowchart of a file search technique implemented in conjunction with the disclosed file storage techniques.

FIG. 7 is a flowchart of a file search process 250 implemented in conjunction with the disclosed file storage techniques. Process 250 works on file tree structures such as file tree 210 organized according to process 220 described above in conjunction with FIG. 6.

Process 250 starts in a "Begin Search File" block 252 and control proceeds immediately to an "Initialize Search" block 254. During Initialize Search block 254, process 250 parses a search string transmitted, typically via a user at keyboard 106 (FIG. 1), into separate search terms and sets a count variable (not shown) to the value of zero ('0'). The search string represents terms that the user is searching for, in this example, in file paths of file tree 210 (FIG. 5).

A search string used as an example for the following description is "(database tutorial lesson*)." In response to this exemplary search string, process 250 looks for directory paths that include a component that matches the term "database," the term "tutorial" and a component that either matches the term "lesson" or begins with the term "lesson," e.g. the term "lesson-1." The character '*' is a wildcard character that matches either none or any number of characters. The character '?' is a wildcard that typically is used to match exactly one character. Those with skill in the art should be familiar with these and other wildcards and their use.

During block 254, process 250 also sets the first term parsed from the search string as the current search term," which in the first iteration of this example is the term "database." Process 250 then proceeds to a "Get Top Node" block 256 during which the current node is set to the top level component of file directory tree 210 as the current search node, which in this example is My Computer 102.

Control proceeds to a "Component Match?" block 258 during which process 250 whether of not the first component in the node under examination matches the current search term. If so, process 250 proceeds to a "Save Filepath" block 260 during which a reference to the entire file path that includes the matching node is saved in memory for later reference. Process 250 then proceeds to an "Increment Count" block 262 during which the count, which was initialized to a value of '0' in block 254 is incremented so that the number of matches, or "hits," for a particular file path can be calculated. Control then proceeds to a "More Nodes?" block 264.

Control also proceeds to More Nodes? block 264 if, in block 258, the current search term does not match the current component, or node, of the file path under examination. During block 264, process 250 determines whether or not the current tree has been fully traversed. If not, control proceeds to a "Get Next Node" block 266 during which process 250 sets another adjacent node in tree 210 as the current node. There are several techniques for traversing a file tree that those with skill in the art should be aware and, as long as only one technique is used at a time, any are suitable for selecting the next node to examine. Once the next node is selected in block 266, process 250 returns to block 258 and processing continues as described above.

If process 250 determines in block 264 that all the node of file tree 210 have been examined, then process 250 proceeds to a "More Terms?" block 268 during which process 250 determines whether or not each term in the search string has been processed. If not, process 250 proceeds to a "Get Next Term" block 270 during which the next unprocessed term is set as the current search term and the current count of hits is reset to a value of '0'. Control then returns to Get Top Node block 256 and processing continues as described above.

If in More Terms? block 268 process 250 determines that all the terms of the search string have been processed, then control proceeds to a "Process & Sort Results" block during which process 250 eliminates duplicate entries in the list of file paths saved in block 260 and sorts the file paths based upon the number of hits as recorded in block 262. Further sorting may occur based upon other factors such as, but not limited to, the location of hits within the string and whether or not a particular file path represents local or remote data storage. Process 250 then proceeds to a "Display Results" block 274 during which the results of all the searching and processing is displayed for the user to see. An example of a search result is provided and explained below. Control then proceeds to an "End Search File" block 279 in which processing is complete.

The following search result is based upon the exemplary search string "(database tutorial lesson*)" and file tree 210, including the portions corresponding to file tree 130 (FIG. 2) that are not shown in FIG. 5:

1. DOC/CLP/DATABASE/DB2/IBM/TUTORIAL/LESSON-1.DOC
2. DOC/CLP/DATABASE/DB2/IBM/TUTORIAL/LESSON-2.DOC
. . .
3. DOC/IBM/TUTORIAL/LESSON-1.DOC
. . .
4. DOC/DATABASE/ORACLE/TUTORIAL/CHAPTER-1.DOC
. . .
5. DOC/DATABASE/IBM/TUTORIAL/CHAPTER-1.DOC
6. DOC/DATABASE/IBM/TUTORIAL/CHAPTER-2.DOC

The search returned six (6) entries sorted by the number of hits corresponding to the search string. Entries #1 and 2 each had three (3) hits because they all have terms that match all three (3) search terms. A blank line is displayed between Entries #2 and 3 to distinguish that that corresponding entries did not have the same "hit" score. Entries #3-6 each scored two (2) hits but have different scores based upon such factors as whether the corresponding file is stored locally or remotely and which of the search terms scored the corresponding hit, e.g. later terms are scored higher than earlier terms. In other words, by reordering a search string, a user can manipulate the order of the resultant list. Of course, those with skill in the art should recognize that there are many viable and valid search, scoring and display options.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

I claim:

1. A method for organizing files in a computer system, the method comprising:
    receiving a request to store information at a file path location;
    parsing the file path location into two or more path components;
    modifying the order of the path components from the order of the path components in the file path location based upon a first ordering specification;
    generating a transformed file path location based a on the modified order of the path components; and
    storing the information at the transformed file path location.

2. The method of claim 1, the modifying the order of the file path components comprising assigning a metric to each component of the two or more components; and
reordering the order of the path components based upon the metrics.

3. The method of claim 2, wherein the metrics are based upon an alphanumeric value.

4. The method of claim 2, wherein each metric is based upon an ordering function.

5. The method of claim 1, further comprising:
    prior to storing the information, modifying the transformed file path location by placing an additional component at the beginning of the transformed file path location.

6. The method of claim 5, wherein the additional component is based upon a file extension associated with the corresponding information.

7. The method of claim 1, further comprising:
    transforming a second file path location; and
    retrieving the information stored at the transformed file path location based upon the transformed second file path location.

8. A system for organizing files, comprising:
    a memory coupled to a processor;
    a file path comprising two or more components;
    logic to receive a request to store information in the memory at a file path location corresponding to the file path;
    logic to parse the file path location into path components;
    logic to modify the order of the path components from the order of the path components in the file path location based upon a first ordering specification;
    logic to generate a transformed file path location based upon the modified order of the path components; and
    logic to store the information at the transformed file path location.

9. The system of claim 8, the logic for modifying the order of the components, comprising
    logic to assign a metric to each component of the two or more components; and
    logic to reorder the order of the path components based upon the metrics.

10. The system of claim 9, wherein the metrics are based upon an alphanumeric value.

11. The system of claim 9, wherein each metric is based upon an ordering function.

12. The system of claim 8, further comprising:
    logic to modify the transformed file path location by placing an additional component at the beginning of the transformed file path location.

13. The system of claim 12, wherein the additional component is based upon, a file extension associated with the corresponding information.

14. The system of claim 8, further comprising:
    a previously stored file, stored according to the system;
    logic to transform a second file path location; and
    logic to retrieve the previously stored file based upon the transformed second file path location.

15. A computer programming product for organizing files in a computer system, the product comprising:
    a memory;
    logic, stored on the memory for execution on a processor, to receive a request to store information at a file path location;
    logic, stored on the memory for execution on the processor, to parse the file path location into two or more file path components;
    logic, stored on the memory for execution on the processor, to modify the order of the file path components from the order of the path components in the file path location based upon a first ordering specification;

logic, stored on the memory for execution on the processor, to generate a transformed file path location based upon the modified order of the path components; and logic, stored on the memory for execution on the processor, to store the information at the transformed file path location.

16. The computer programming product of claim 15, the logic for modifying the order of the file path comprising logic, stored on the memory for execution on the processor, to assign a metric to each component of the two or more components; and logic, stored on the memory for execution on the processor, to reorder the order of the path components based upon the metrics.

17. The computer programming product of claim 16, wherein the metrics are based upon an alphanumeric value.

18. The computer programming product of claim 16, wherein each metric is based upon an ordering function.

19. The computer programming product of claim 15, further comprising:

logic, stored on the memory for execution on the processor, to modify the transformed file path location by placing an additional component at the beginning of the transformed file path location.

20. The computer programming product of claim 19, wherein the additional component is based upon a file extension associated with the corresponding information.

* * * * *